United States Patent [19]

Fling

[11] Patent Number: 5,251,271
[45] Date of Patent: Oct. 5, 1993

[54] METHOD FOR AUTOMATIC REGISTRATION OF DIGITIZED MULTI-PLANE IMAGES

[75] Inventor: Russell T. Fling, Naperville, Ill.

[73] Assignee: R. R. Donnelley & Sons Co., Lisle, Ill.

[21] Appl. No.: 780,009

[22] Filed: Oct. 21, 1991

[51] Int. Cl.$^5$ .............................................. G06K 9/32
[52] U.S. Cl. .................................. 382/44; 382/41; 382/154; 358/527
[58] Field of Search ................ 382/44, 41, 54, 48, 382/45, 42; 358/105, 80; 356/2

[56] References Cited

U.S. PATENT DOCUMENTS

| | | | |
|---|---|---|---|
| 3,905,045 | 9/1975 | Nickel | 382/44 |
| 4,500,919 | 2/1985 | Schreiber | 358/80 |
| 4,641,244 | 2/1987 | Wilson et al. | 364/475 |
| 4,644,582 | 2/1987 | Morishita et al. | 382/44 |
| 4,654,876 | 3/1987 | Atkins | 382/44 |
| 4,680,625 | 7/1987 | Shoji et al. | 358/80 |
| 4,683,492 | 7/1987 | Sugiura et al. | 358/80 |
| 4,700,399 | 10/1987 | Yoshida | 382/17 |
| 4,717,954 | 1/1988 | Fujita et al. | 358/80 |
| 4,727,434 | 2/1988 | Kawamura | 358/280 |
| 4,819,193 | 4/1989 | Imao | 364/526 |
| 4,839,722 | 6/1989 | Barry et al. | 358/80 |
| 4,849,775 | 7/1989 | Izumi | 346/151 |
| 4,855,765 | 8/1989 | Suzuki et al. | 346/154 |
| 4,870,506 | 9/1989 | Nakauchi | 358/296 |
| 4,887,151 | 12/1989 | Wataya | 358/80 |
| 4,929,978 | 5/1990 | Kanamori et al. | 355/38 |
| 4,931,815 | 6/1990 | Sato et al. | 346/154 |
| 5,067,014 | 11/1991 | Bergen et al. | 358/105 |
| 5,070,465 | 12/1991 | Kato et al. | 382/44 |
| 5,111,514 | 5/1992 | Ohta | 382/44 |

OTHER PUBLICATIONS

Article—Image Fit and Register on a Multi-Color Sheetfed Press—Field Observations and Experiments—by Prince—Graphic Arts Technical Foundation.

Article—by Wang—Journal of Imaging Technology 15:279-281 (1989)—An Evaluation of the Effect of Misregister on GCR and Conventional Chromatic Separations in Multicolor Halftone Printing.

Article—by Pratt—Correlation Techniques of Image Registration Image Processing Institute University of Southern California.

*Primary Examiner*—Joseph Mancuso
*Attorney, Agent, or Firm*—Wood, Phillips, Van Santen, Hoffman & Ertel

[57] ABSTRACT

A method is provided for registering digitized multi-plane color images. The method designates one plane as the reference plane and registers each of the other warped planes with the reference plane. Each plane comprises pixels representing luminosity values having scalar x and y coordinates representing positions in the horizontal and vertical directions, respectively, of the plane. The planes are divided into regions. Correlation values are calculated for regions within the divisional region of the reference plane with a plurality of regions offset from the corresponding warped divisional region. A warp error value is calculated for each pixel of each divisional region as a function of the scalar offset. The warp error values are interpolated and added to the current position of each pixel of the warped plane.

20 Claims, 11 Drawing Sheets

Fig. 21

```
image ciadsb.cmyk  at  region 0,0    plane 0   reference 1
--     --     --     --     --     --     --     --     --     --
--     0.5    --     0.5    --     0.5    --     0.4    --     0.3    --
--     0.5    --     0.5    --     0.62   --     0.5    --     0.5    --
0.73   0.71   0.69   0.69   0.73   0.67   0.6    0.5    --     --     --
0.77   0.826  0.868  0.915  0.990  0.937  0.80   0.72   0.63   0.6    0.5
0.6    0.66   0.72   0.826  0.978  1.000  0.917  0.880  0.822  0.77   0.74
--     0.5    0.5    0.61   0.73   0.76   0.70   0.70   0.69   0.69   0.71
--     --     --     --     0.66   0.65   0.6    --     --     --     --
--     0.5    --     0.6    --     0.66   --     0.5    --     0.5    --
--     --     --     --     --     --     --     --     --     --

Max correlation (1.2E+10) is at -0.29,0.70
```

Fig. 22

```
image ciadsb.cmyk  at  region 0,0    plane 2   reference 1
--     --     --     --     --     --     --     --     --     --
--     0.5    --     0.5    --     0.6    --     0.5    --     0.4    --
--     0.6    --     0.60   0.6    0.68   0.66   0.63   --     0.6    --
--     --     0.75   0.78   0.77   0.834  0.803  0.71   0.64   0.61   0.6
--     0.64   0.69   0.79   0.840  0.979  1.000  0.905  0.816  0.77   0.70
--     0.5    --     0.6    0.63   0.75   0.810  0.77   0.74   0.76   0.73
--     0.5    --     0.5    0.6    0.62   0.65   0.6    0.6    0.6    0.6
--     0.4    --     0.4    --     0.5    --     0.5    --     0.5    --
--     --     --     --     --     --     --     --     --     --

Max correlation (7.5E+09) is at 0.68,0.01
```

Fig. 23

```
Image ciadsb.cmyk  at  region 0,0    plane 3   reference 1
--     --     --     --     --     --     --     --     --     --
--     0.5    --     0.5    --     0.5    --     0.4    --     0.4    --
--     --     --     --     --     --     --     --     --     --
--     0.6    --     0.60   0.64   0.69   0.67   0.63   --     0.6    --
0.76   0.76   0.76   0.73   0.74   0.79   0.73   0.65   0.60   --     --
0.72   0.77   0.830  0.866  0.925  1.000  0.930  0.813  0.73   0.69   0.64
0.6    0.63   0.67   0.74   0.816  0.920  0.924  0.868  0.828  0.807  0.77
--     0.6    --     0.61   0.64   0.71   0.70   0.68   0.68   0.69   0.71
--     --     --     --     --     --     --     --     --     --
--     0.4    --     0.5    --     0.6    --     0.6    --     0.5    --
--     --     --     --     --     --     --     --     --     --

Max correlation (1.1E+09) is at 0.02,0.23
```

METHOD FOR AUTOMATIC REGISTRATION OF DIGITIZED MULTI-PLANE IMAGES

FIELD OF THE INVENTION

This invention relates to registration techniques and more particularly relates to obtaining an accurate registration of digitized multi-planes images in order to obtain clear high quality color prints.

BACKGROUND OF THE INVENTION

Graphic arts photography uses light-sensitive photographic materials to record images. The usual product of the photographic process is a negative in which the light portions are represented by dark deposits of silver. When negatives are printed on paper or film, positives are produced in which tone values are similar to the original image. Some printing processes use negatives, others use positives.

Color reproductions of an image can be made by photographing the image through three separate filters. These filters correspond to the three additive primary light colors, red, green, and blue. The three additive primary light colors together form white light.

Placing a green filter over a camera lens produces a negative recording of all green light reflected from the subject. When a positive or print is made from this negative, the silver in the film corresponds to areas that absorbed green light. These areas correspond to the red and blue colors, which are called magenta, a subtractive primary color.

Primary subtractive colors represent the two additive primaries colors left after one primary has been subtracted from white light. There are three primary subtractive colors, cyan, magenta, and yellow. Printing processes usually use inks of the subtractive primary colors to produce color prints. Due to the limitations of the color pigmentations used in inks, a fourth color, black, called key in the industry, is added. Black allows for better contrasts.

High quality printing, such as the quality used for magazines, requires accurate color reproductions. There are several processes that are used to convert from the red, green, and blue primary colors recorded by video cameras, to the cyan, magenta, yellow and key subtractive colors used for the inks in producing color prints.

The accuracy of the color reproduction and the overall quality of the print are also dependant on the accuracy of the registration or alignment of the separate color films. For example, when two films such as those illustrated in FIGS. 1 and 2, are not properly aligned, the resulting print will have a border of a color around the edges between colors, as illustrated in FIG. 3.

Therefore, there is a need for accurately registering the separate color films used to produce a high quality print. An effective way to register the separate color films would be to use a computer. However, there are many difficulties in using a computer to register films such as the computationally intensive nature of the registration process.

Color images can be digitally stored in computers as planes of information. Each plane corresponds to a separate color. Pixels at horizontal and vertical x and y positions have values corresponding to the luminosity of the color at that positions wherein a "0" indicates no amount of the color is present while a "1" indicates the greatest possible amount of the color is present.

There are some video cameras which do not have registration errors because only one sensor is used for the image and the image data is divided into separate planes after the image as a whole is recorded. It is not always desirable to use these video cameras because of problems with resolution, and color fidelity.

Scans of contone, or continuous tone, color images using a high quality drum scanner do not have registration errors. However, scans of halftone images, containing very small dots of varying sizes used in many type of printing processes, can have registration errors.

Some registration methods, require that registration be accurate during scanning. However, multisensor video cameras can have errors in registration.

Even when a print is made from separate films that were formerly registered, the registration can become inaccurate due to the stretching of the film and other problems with mechanical tolerances.

Complex warps, as shown in FIGS. 5 through 7, such as parabolic warps, can occur in films that have been stored for long periods of time prior to making a print. Complex warps also can arise during digital preliminary. Digital preliminary digitally captures and processes images without the need for film.

There is a problem in efficiently and accurately registering films to imperceptible levels especially when image planes are warped in complex ways. There is also a problem in being able to register planes with or without test images.

The present invention is directed toward overcoming one or more of the above problems.

SUMMARY OF THE INVENTION

A method is provided for registering a plurality of digitized multi-plane color images. The method designates one of the planes as a reference plane and registers each of the other planes, the warped planes, with the reference plane. Each plane comprises pixels representing luminosity values having scalar x and y coordinates representing positions in the horizontal and vertical directions, respectively, of the plane.

The image is divided into a plurality of regions wherein each region in the reference plane has a corresponding region of the same area in the warped plane.

A correlation region is designated within the reference region. The correlation region is centered at a central pixel of the reference region. The correlation region has pixels removed from along each edge corresponding to an error range for a warp error value. A corresponding correlation region is centered at a central pixel of the corresponding region of the warped plane.

A plurality of correlation values are calculated between the reference correlation region and a plurality of correlation regions on the warped plane centered at a pixel offset from the warped region central pixel in a plurality of x and y directions. The plurality of correlation values are compared to identify which of the offset correlation regions has the maximum correlation value with the reference correlation region.

Warp error values in the x and y directions are calculated for the warped correlation region as a function of a scalar offset value corresponding to the offset of the central pixel for the maximum offset correlation region from the central regional pixel.

Filtered warp values are calculated by filtering the warp value for a region using a kernel. The filtered warp values are then added to the pixel positions.

Further accuracy is achieved by calculating phantom regions around the border of the plane as a function of warp error values for border regions and neighboring regions. Each pixel of the warped plane is then interpolated with neighboring pixels to determine the correct pixel position.

It is an object of the present method to provide a method for registering digitized multi-plane images which provides for highly accurate registration. Moreover it is an object to provide a registration technique which minimizes the number of computations and thus computer time. The present method can register a 1K×1K image in twenty minutes using a MASSCOMP computer.

It is a further object of this method to provide a registration technique that provides flexibility in registering mutltiplane images. There are no special mechanical requirements needed to perform the registration. The method can work on any image that can be scanned, digitized and can be stored in the computer as planes of data. There is also no requirement that a test image be used.

Another object of the present method is to achieve accurate alignment of planes that have been warped in complex ways.

Other objects and advantages will become apparent from the following specification taken in connection with the accompanying drawings.

BRIEF DESCRIPTION OF THE DRAWINGS

FIGS. 21-23 are charts of correlation data.

DESCRIPTION OF THE PREFERRED EMBODIMENT

The registration method is implemented through a two part computer algorithm. The data for the algorithm are digitized pixels of separate color planes of an image corresponding to the cyan, magenta, yellow and key components used for printing. The red, blue and green color planes of an image may also be used as input data as well as any other types of planes requiring alignment.

These planes are stored in a computer as pixels corresponding to the luminosity of the color at a given x,y location corresponding to the horizontal and vertical positions within the plane.

The data is stored as an array of pixel values. The pixel values correspond to the degree of luminosity present for that color. The values for the pixels are in the range of 0 to 1, where 0 indicates no presence of that color and 1 indicates full presence of that color.

This algorithm can register separate color films that are scanned and digitally stored in a computer as digitized planes. The algorithm can also be used to register images that were recorded using digital cameras.

A special test image is not required, but, better results are obtained when one is used. This algorithm will work with many types of images. However, the best images will have some well defined horizontal and vertical edges with all edges spaced equally over the entire image.

There are no mandatory requirements for the type of image that can be registered. One of the advantages of this method is that it performs well for a variety of images. The algorithm has been tested on several images with good results even with little apparent detail.

Figure 8:
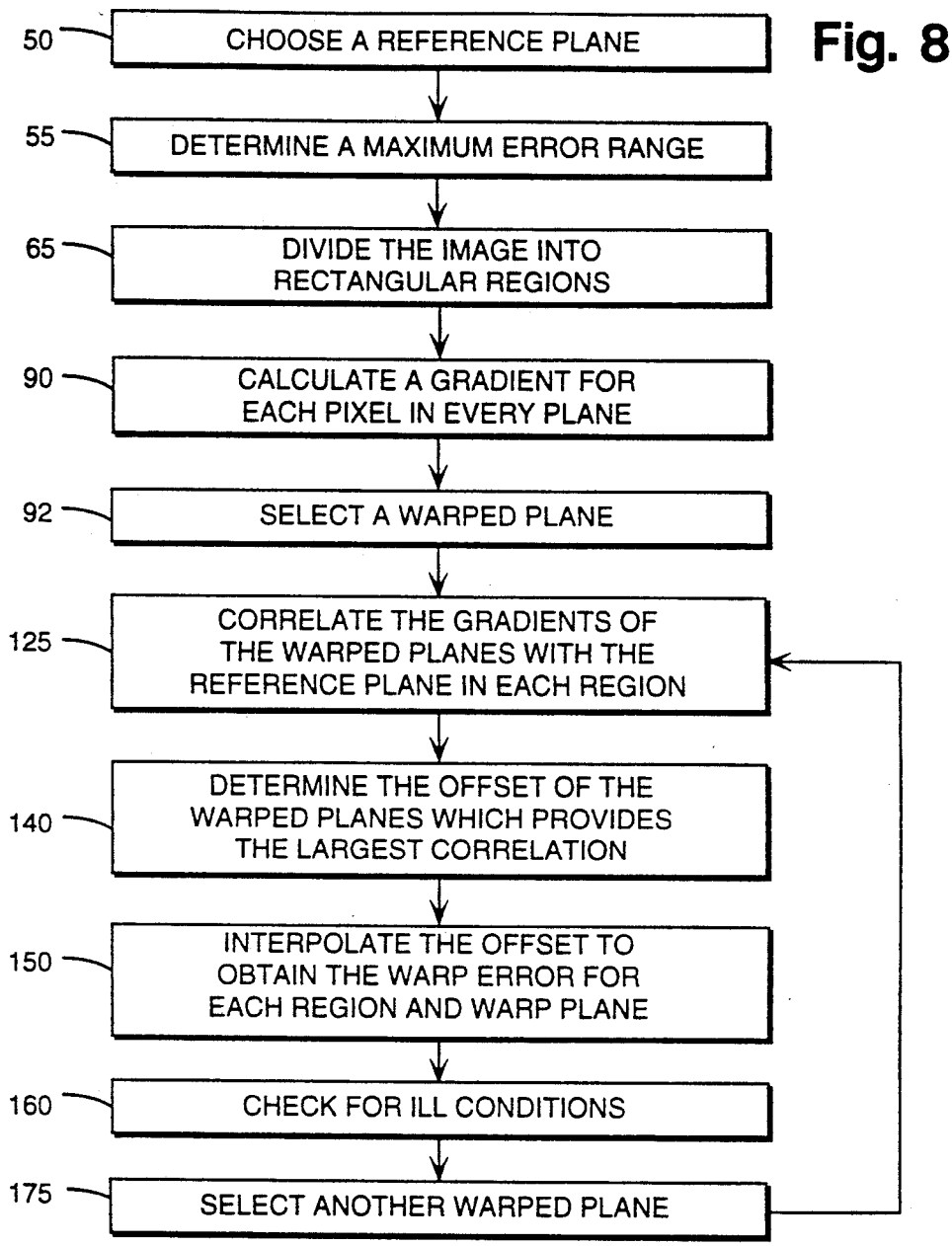
FIG. 8 is a flow chart for the algorithmic process which determines warp error values for regions of a plane.
Figure 9:
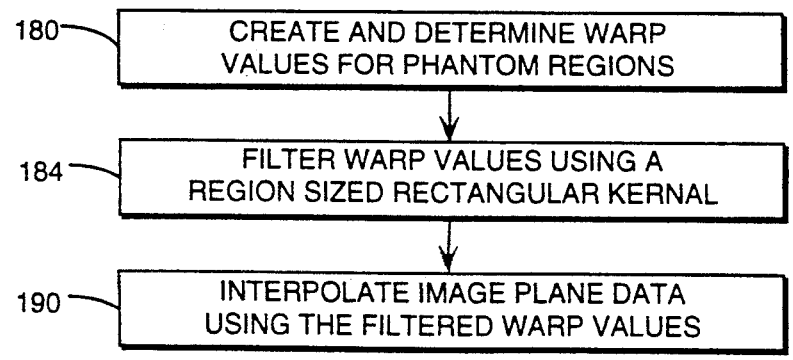
FIG. 9 is a flow chart for the algorithmic process which uses the warp error values determined by the algorithm of FIG. 8 to affect the registration of the planes.

Referring to FIG. 8, the first part of the algorithm is a correlation phase process which determines from the image planes the warp error values corresponding to the correction needed to be made to bring all of the planes into alignment. Referring to FIG. 9, the second part of the algorithm is a warping phase which implements the correction values determined in the first part.

In some cases, where the correction to be done is the same over several images, the correlation phase of the first part need only be performed once while the latter is performed on each plane. This results in the reduced number of computations.

FIGS. 16 through 23 illustrate graphically the process performed by the algorithm. The pixels within the regions are shifted according to the warp error values determined by the algorithm. As can be seen, the pixels in the various regions within the same plane are shifted varying amounts in varying x,y directions.

Figure 1:
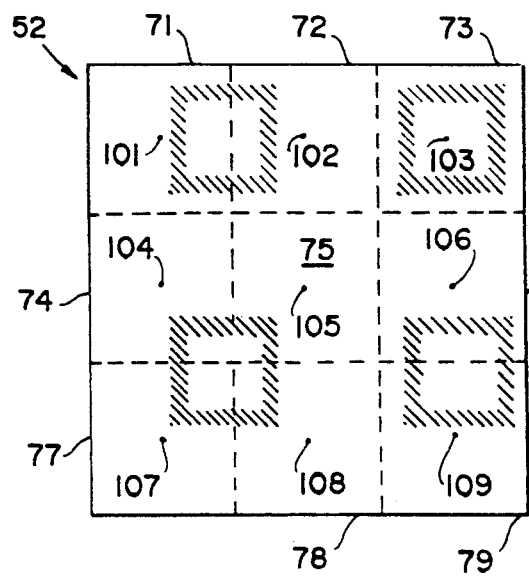
FIG. 1 is a magenta film of an image.
Figure 10:
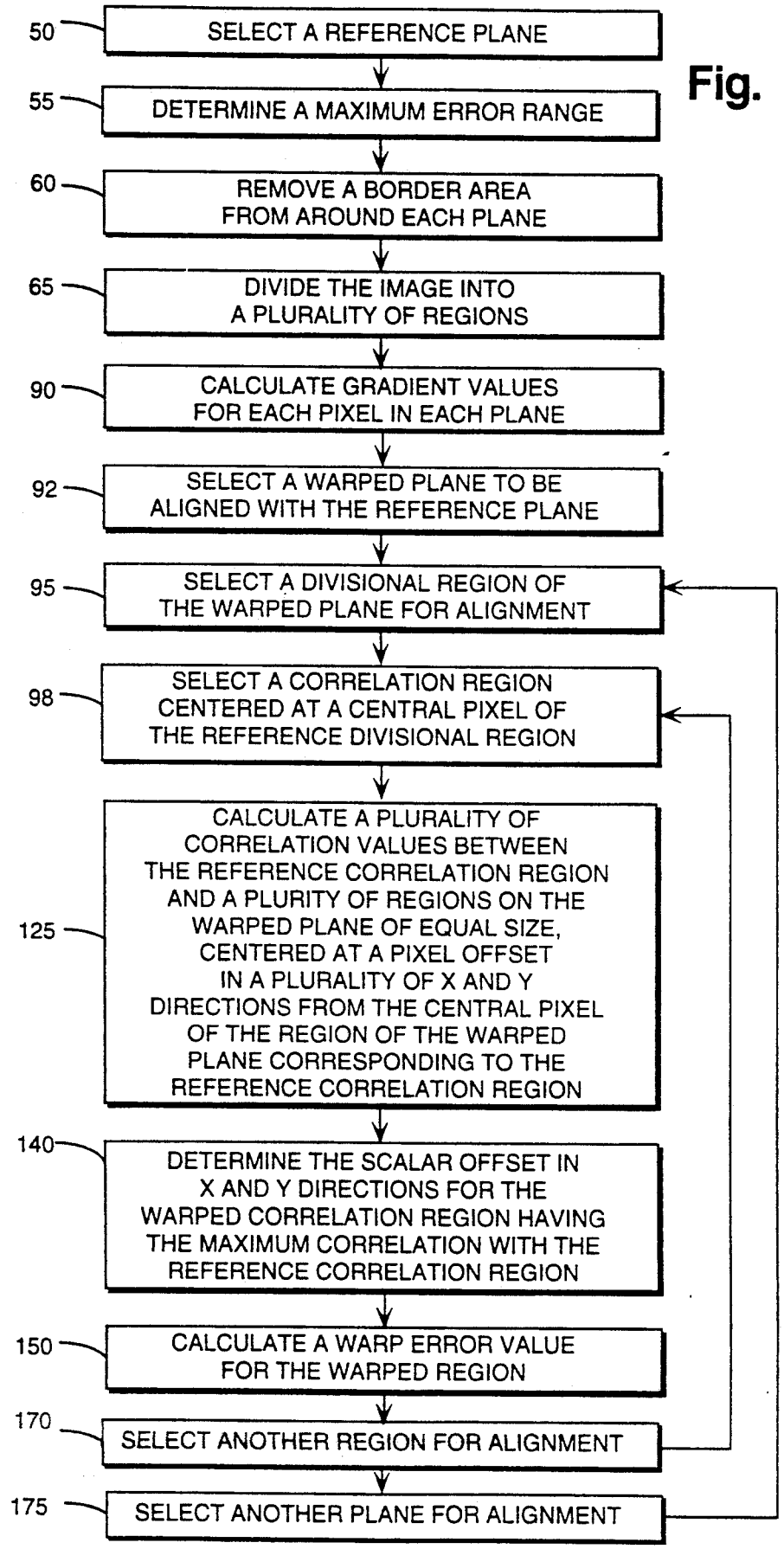
FIG. 10 is a detailed flow chart for the algorithmic process which determines warp values for regions of a plane.
Figure 11:
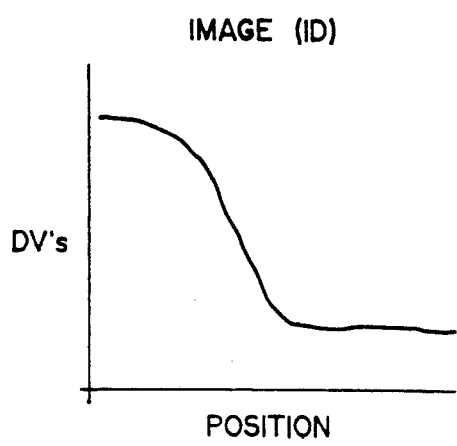
FIG. 11 is a graph of the digitized luminosity values for pixels of a region of a plane versus their position.
Figure 13:
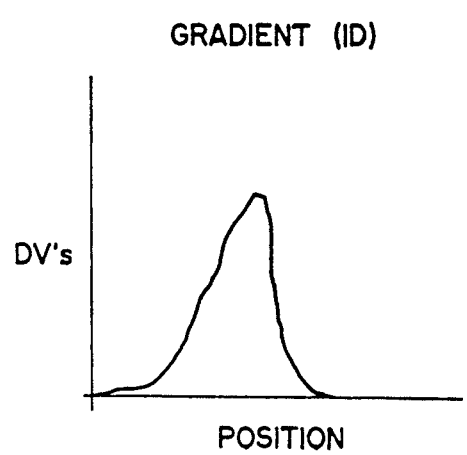
FIG. 13 is a graph of the values of the gradients for the pixels of the region of FIG. 12 versus their position.
Figure 12:
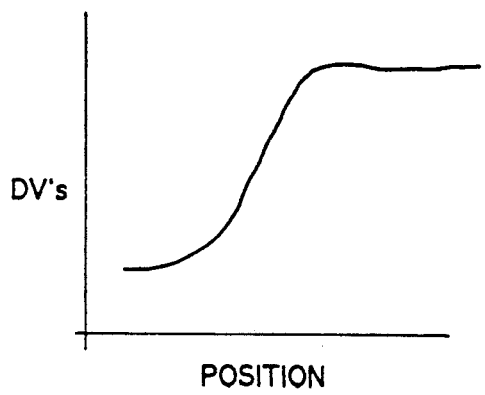
FIG. 12 is a graph of the digitized luminosity values for the pixels for a corresponding region of a second plane versus their position.
Figure 14:
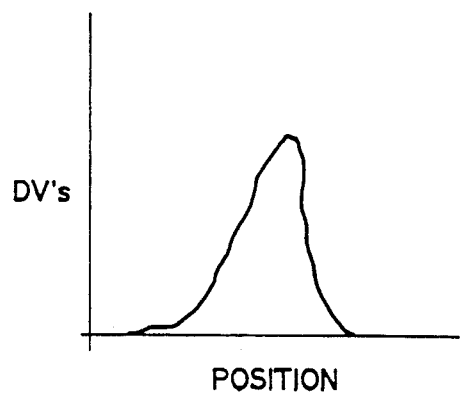
FIG. 14 is a graph of the values of the gradients for the pixels of the region in FIG. 12 versus their position.
Figure 15:
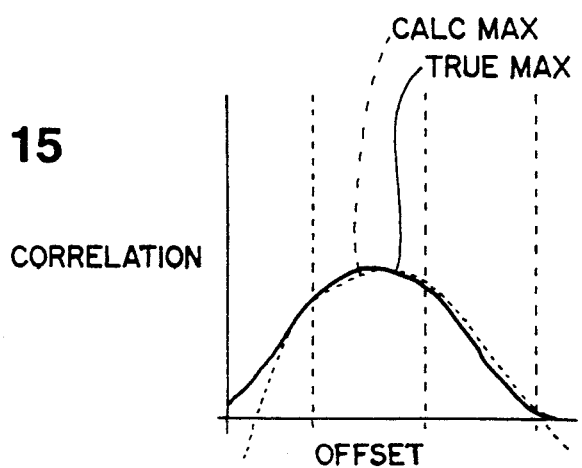
FIG. 15 is a graph of the correlation value for the regions of FIGS. 11 and 12 versus the offset between the regions.
Figure 16:
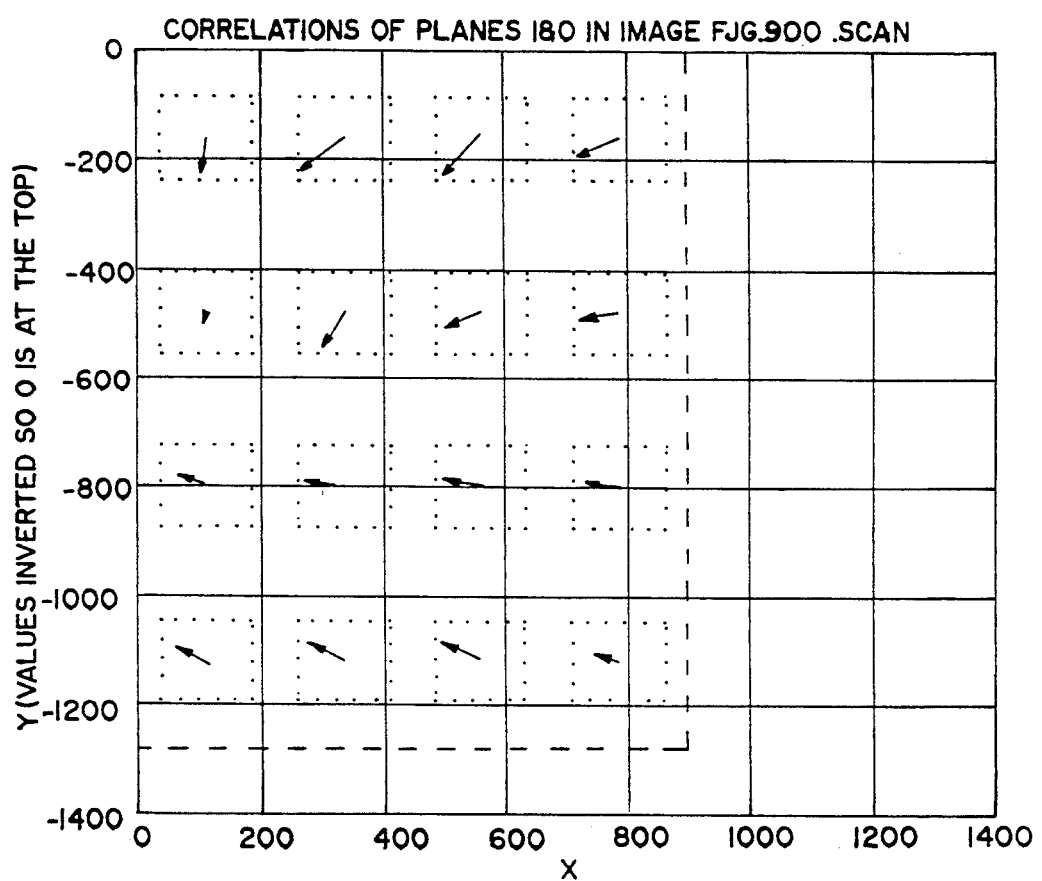
FIGS. 16-20 are diagrammatic illustrations depicting offsets for registration.
Figure 17:
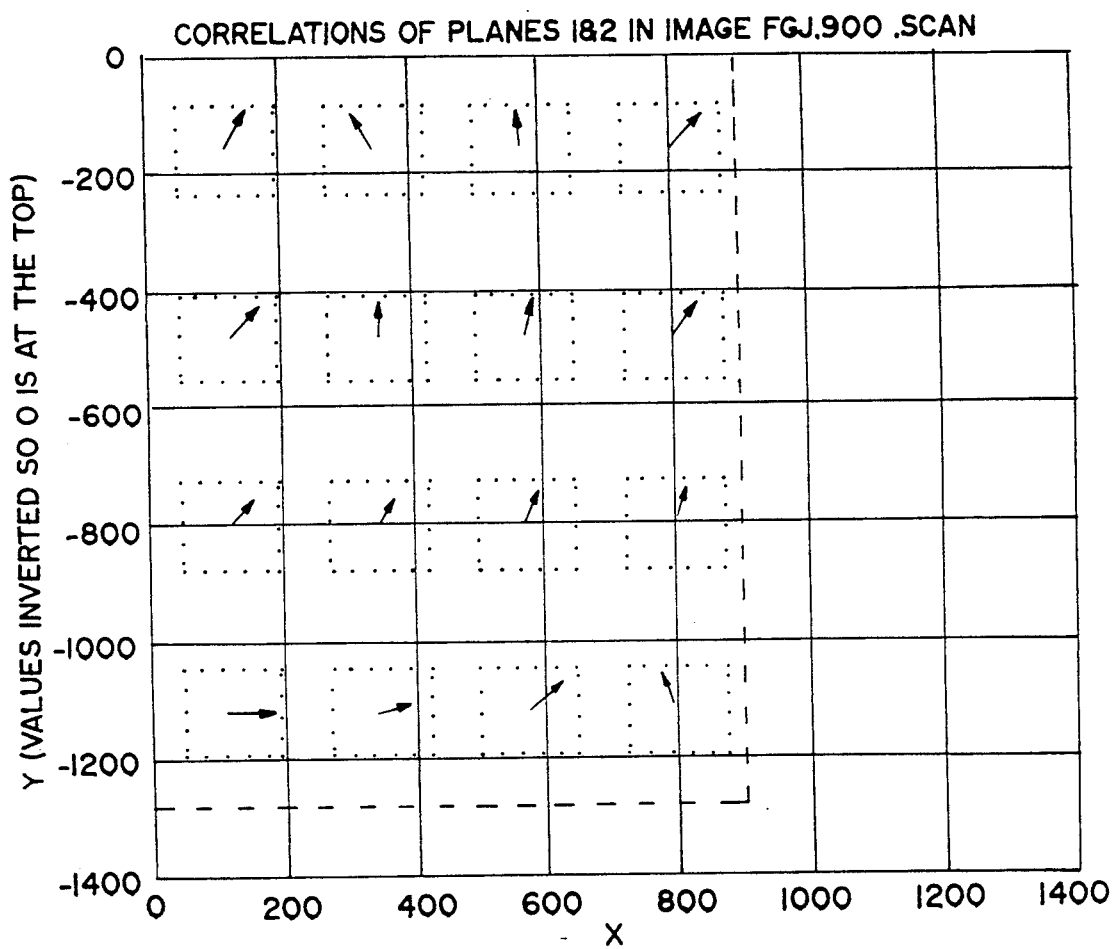
Figure 18:
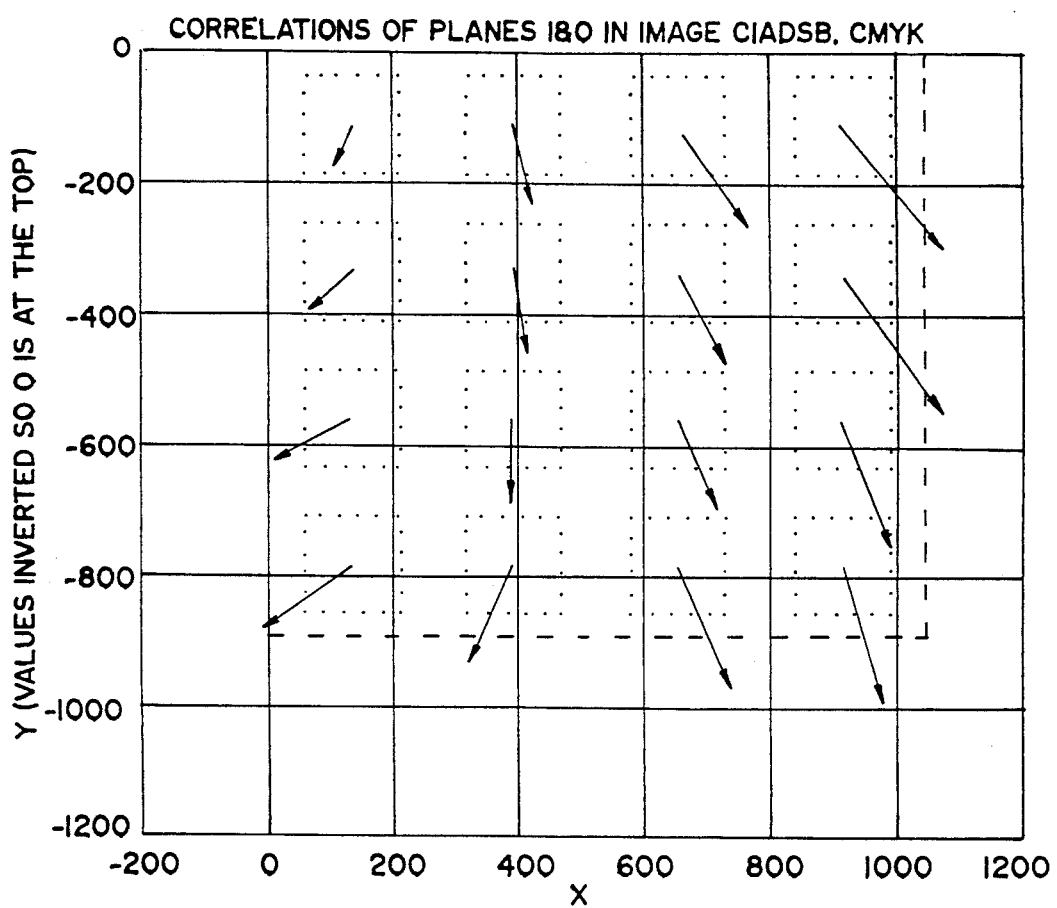
Figure 19:
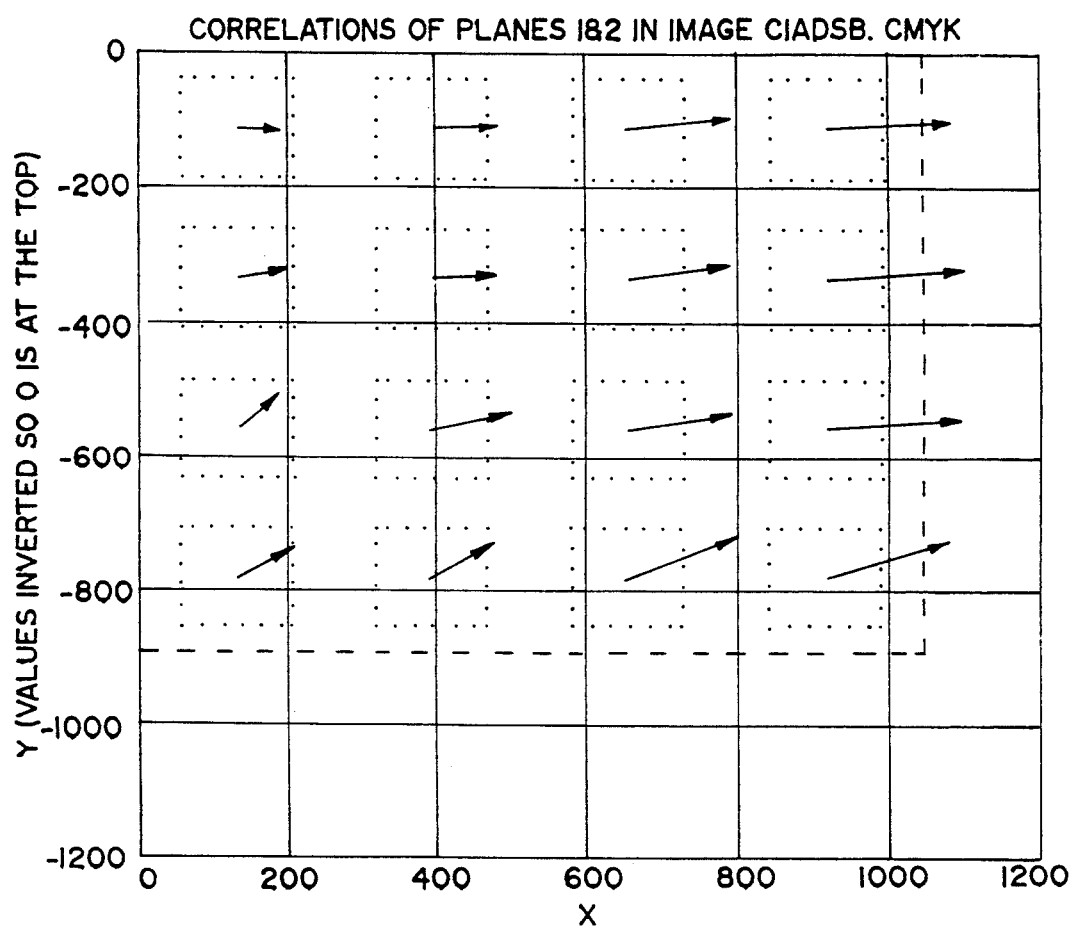
Figure 20:
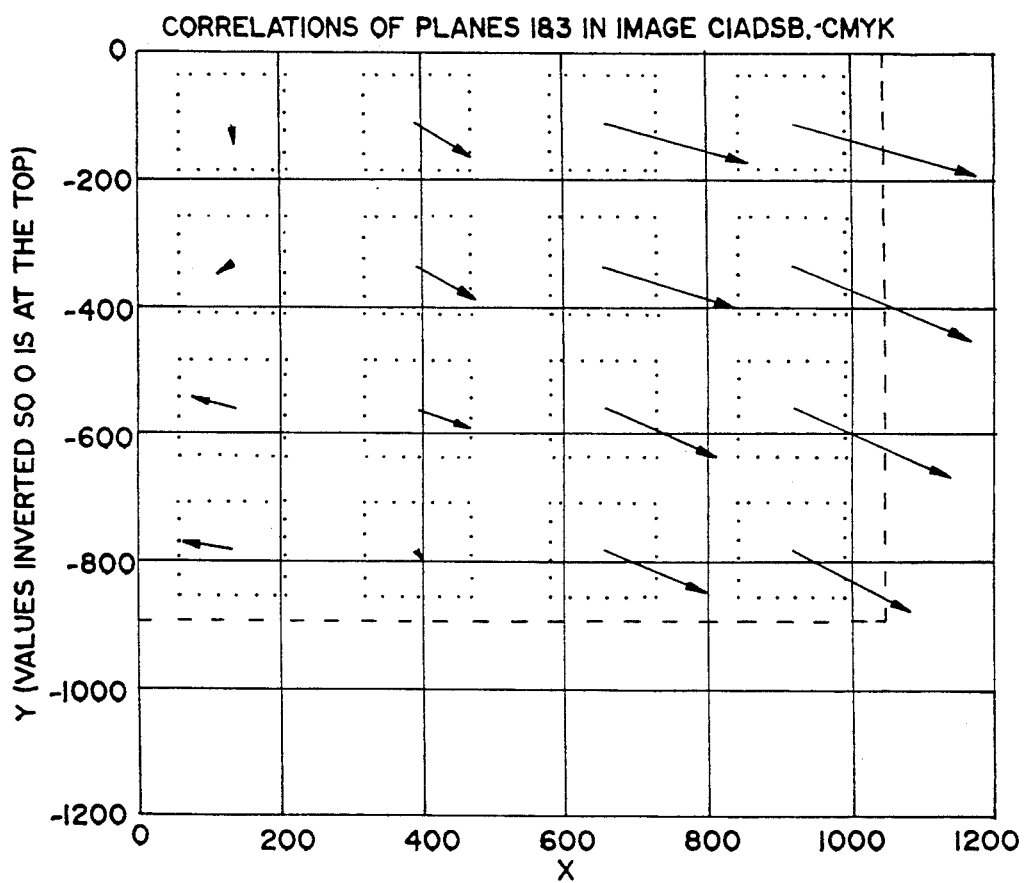

Referring to FIG. 10, the correlation phase of the algorithm is explained in greater detail. A plane is chosen as a reference plane with which each of the other planes will be aligned 50. Referring to FIG. 1, an exemplary reference plane 52 is shown. Preferably, the magenta plane from the cyan, magenta, yellow and key planes is used as the reference plane. When red, green and blue planes of the image are used as data, the green plane would preferably be used. The green and magenta planes carry most of the luminance information for which the eye is most sensitive. It is preferable not to modify the pixels of the magenta or green planes in order to minimize the errors from the warping process.

Next, a maximum warp error range is chosen for the image 55. This value corresponds to the number offset positioned that are explored in order to find a maximum correlation offset. This will be explained further below. The determination of a value for the error range will depend on the amount and variation of details in the image to be registered.

A small border of pixels from around the entire image is removed 60. The edge of the image sometimes contains non-image information such as jagged edges of the film. This information should not be used to determine the registration of the film. Therefore removing a small border around the entire image is desirable for obtaining accurate registration.

The image is divided into a plurality of equal rectangular divisional regions 65. A warp error value will be calculated for each region.

Figure 2:
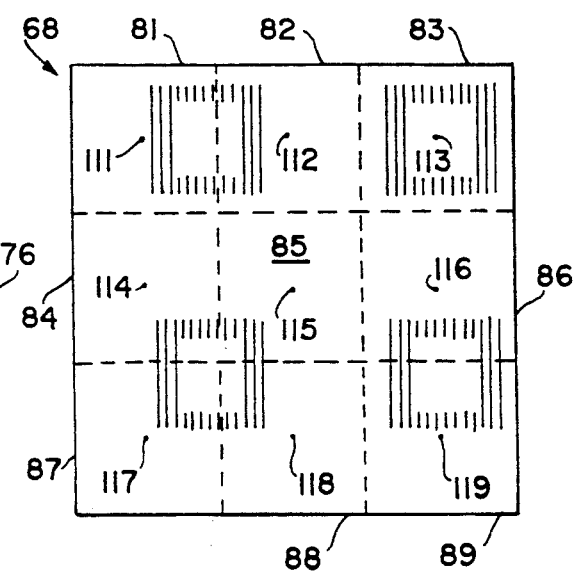
FIG. 2 is another color film of the same image as FIG. 1.
Figure 3:
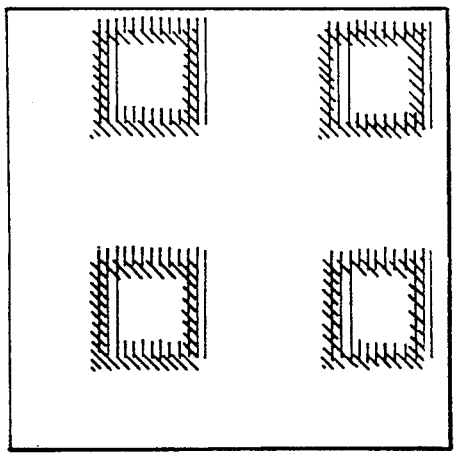
FIG. 3 is a color print from FIGS. 1 and 2 that is not properly registered.
Figure 4:
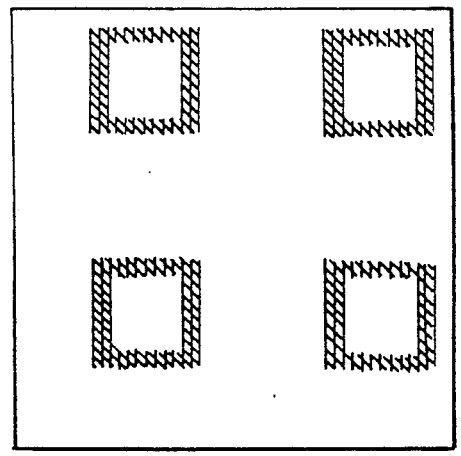
FIG. 4 is a color print of FIGS. 1 and 2 that is properly registered.
Figure 5:
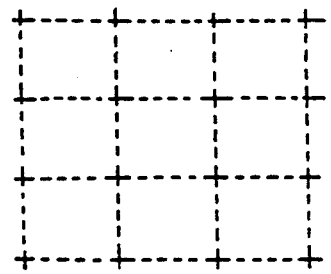
FIG. 5 is a schematic illustration of a group of pixels.
Figure 6:
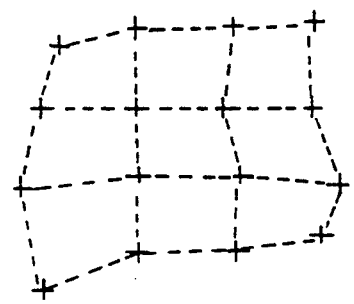
FIGS. 6 and 7 are schematic illustrations of the pixels of FIG. 1 non-linearly warped.
Figure 7:
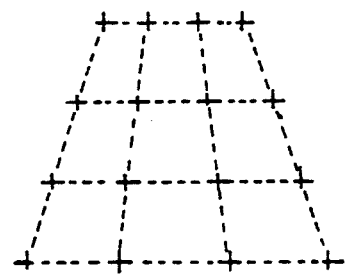

Referring to FIGS. 1 and 2, the magenta reference plane 52 and a warped plane 68 are each shown divided into 3×3 rectangular regions of equal area, 71–79, and 81–89, respectively.

The image can also be divided into a 3×4 array of regions. For many images, a 2×2 image is adequate, i.e. dividing the image into quarters. It is rare that any image would require greater than 3×3 array regions.

A 1×1 array of regions, corresponding to the entire image, could be used. However, only basic shifts in the x and y directions of the planes could be corrected. A 2×2 array of regions would allow for x,y shifts as well as stretches in different directions and rotations. A 3×3 array of regions enables x,y shifts, stretches in different directions, rotations plus parabolic corrections and other strange warps.

It is particularly important to be able to correct complex warps that arise from video cameras with vidicons which tend to have parabolic errors. Therefore, it can be desirable to divide the image into a greater number of regions to correct more complex warps.

The greater the number of regions that are used, the more complex the warpings that can be fixed. However, the greater the number of regions used, the smaller the size of each individual region, which reduces the numbers of edges in each region, and thus, reduces the accuracy of the registration.

The fewest regions should be used which satisfy the degree of freedom required. Some images may be soft (i.e. not have many edges) so that the number of regions must be reduced. However, this is not a problem because the smaller the number of edges contained in an image the less the importance of perfect registration.

The image planes are filtered prior to performing correlations to find a warp error value for each region. The correlations could be calculated on non-filtered image planes but the results would not be as robust.

The filtering that is performed in the preferred embodiment as shown in FIGS. 8 and 10, calculates the gradient or maximum slope of the image at a given pixel 90. Referring to FIGS. 11 through 15, the luminosity values for the pixels of a region of a plane are graphically represented in FIGS. 11 and 12 for two different planes. The gradients or slopes of these luminosity values are then calculated. This is graphically represented in FIGS. 13 and 14. The correlation between the gradients of these two different color planes is then calculated. The correlation is calculated over a range of possible position offsets between the planes. The optimal offset corresponds to the maximum correlation value. Using gradient values rather than luminosity values allows for better correlation determinations and has an additional advantage of determining maximum correlation based on the location of edges in the image. This is particularly important since it is at the edges that non-alignment is most noticeable.

There are many methods that can be used to calculate gradient values for pixels. Examples of methods for calculating gradients can be explained with reference to the following arrangement of pixels having luminosity values corresponding to the referenced letters:

| A | B | C | D | E |
|---|---|---|---|---|
| F | G | H | I | J |
| K | L | M | N | O |
| P | Q | R | S | T |
| U | V | W | X | Y |

The gradient calculations that can be determined for a plane at pixel A are:

1. $(A-C)^2 + (A-K)^2$
2. $(A-B)^2 + (A-F)^2$
3. $(A-U)^2 + (A-E)^2$
4. $\sqrt{(A-C)^2 + (A-K)^2}$
5. $abs(A-B) + abs(A-F)$ In the preferred embodiment of this algorithm, the first option is used, where the square of the maximum slope at the pixel A is determined. The values of the pixels two positions over in the x direction from pixel A and the pixel value two positions over in the y direction are subtracted from the value of pixel A, each result is squared and then added together. This method was judged to be superior. One of the reasons for the superiority of option 1 is that the noise in flat areas is dominated by the edges due to the squaring process.

All of the foregoing methods have the characteristics of always being positive and having a value of zero in flat areas and increasing in value with increasing slope but not always linearly. Many of these gradient calculations are less desirable to be used because they are more computationally intensive and therefore require more processing time, such as calculating the square roots in option 4.

The separation of two pixels used in option 1 has been found to be a good compromise between images with sharp edges and those images with soft edges. Images with sharp edges obtain better results with option 2, while images with soft edges obtain better results with option 3. Option 5 is a desirable choice because it uses the least number of computations.

All the foregoing gradient calculations use pixels from the lower right quadrant relative to the pixel. Other calculations could use pixels from all sides of the pixel for which the gradient is being calculated. There are diminishing returns with negative effects from trying to use too many pixels in the gradient calculation.

Many more methods than those discussed above are possible for determining a gradient filter for the images as can be appreciated by those skilled in the art.

As can be appreciated, using gradient calculations reduces the number of pixels in the plane data. For example, option 2 relies on calculating a gradient value for a pixel in terms of pixels two away. Therefore the data plane is reduced by two pixels in both the x and y directions of the raw image.

In an alternative embodiment, the image is divided into overlapping regions so that the gradient can be calculated over the entire area and thus not reduce the size of image data. The difference in the result is minimal because the overlap involves a small amount of pixels relative to the total number of pixels in the region.

The correlation process is carried out on the gradient values for each pixel of each region of each warped plane. The remaining steps of the correlation phase are performed on each divisional region of a warped plane and for each warped plane.

A plane is selected as a warped plane 92, such as the plane 68, in FIG. 2. A pair of corresponding divisional regions is selected to calculate a warp error value for the warped divisional region 95. Referring to FIGS. 1 and 2, regions 71 and 81 are corresponding divisional regions. A warp error value is calculated for the warped divisional region 81.

A correlation region is selected centered at a central pixel of the reference divisional region 98. Referring to FIGS. 1 and 2, each of the divisional regions 71-79 of the reference plane 52 has a central pixel 101-109. Each of the divisional regions 81-89 on the warped plane 68 has a central pixel 111-119.

A plurality of correlation values are calculated between the reference correlation region and a plurality of offset regions on the warped plane of equal size. The offset regions are each centered at a pixel that is offset in a plurality of x and y directions from the central pixel of the region of the warped plane corresponding to the reference correlation region 125.

Referring to FIGS. 1 and 2, a reference region is centered at pixel 101. Offset regions are centered at pixels offset from pixel 111. An offset of 0, 0 in the x and y direction means that the offset region is centered at the divisional region. The offset can take on values in the plus or minus range for both the x and y directions. The range of values for the offset corresponds to the error offset selected by the user.

The correlation region is smaller than the gradient region so that its size can remain constant for any valid offset. This minimizes any errors in the correlation results due to the changing number of summations. Within the alignment region a correlation region is selected to accommodate the warp error range. The number of pixels in the correlation range is reduced from the size of the gradient region by twice the error range in both the x and y directions.

All the corresponding gradient values for pixels in the correlation regions of the reference and warp planes are multiplied. The resulting values are then summed to provide a single scalar value which is the correlation value at that offset.

The number of pixels on which calculations are made for each region corresponds to the size of the correlation region. An exemplary image has $512 \times 1024$ pixels. When a 4 pixel boundary is removed 60, there are $(512-2*4) \times (1024-2*4)$ pixels in the plane, which is $504 \times 1016$ pixels. When the region is broken into $2 \times 2$ divisional regions 65, there are $(504/2) \times (1016/2)$ or $252 \times 508$ pixels.

The size of the divisional region becomes $(252-2) \times (508-2)$ pixels, or $250 \times 506$ using the first option to calculate gradients where a $2 \times 2$ border is removed from x and y directions since gradients cannot be calculated for those pixels. For a error range of 4 pixels, meaning correlations will be calculated for offset regions offset by four pixels in the x and y directions, the $250 \times 506$ plane gets reduced to $(250-2*4) \times (506-2*4)$, or $242 \times 498$.

The example above would require that 120,516 multiplications and summations be performed for calculating the correlation at one offset.

In an alternate embodiment, the correlation region is the kept the same size as the gradient region and some pixels in the reference correlation region do not have corresponding pixels in the warp correlation region except at offset (0,0). Multiplications are not performed for all pixels of the reference correlation region and the total number of summations change from offset to offset. To compensate for the variations, the correlation result is normalized by the number of summations.

A maximum correlation value is determined from the correlation values for the offset regions. The scalar offset in the x and y directions corresponding to the warped correlation region having the maximum correlation with the reference correlation region 140.

In one embodiment, the correlations are calculated for every possible offset within the error range to determine the maximum correlation. The correlation region in the warp plane starts out centered within the gradient region corresponding to the position of the reference gradient region. The area of the warped plane which is considered the warped correlation region is offset in a plurality of pixels in the x and y directions corresponding to each offset value in the warp error range. As can be appreciated, several more calculations are performed than are required.

In a preferred embodiment, the number of calculations can be minimized by selectively searching the offsets for the maximum. This is not required but it does reduce the time for processing.

An exemplary algorithm for minimizing the number of correlation calculations made, calculates the correlations for every other offset in the x and y directions, which is a quarter of all possible correlations. Coarser sampling could also be done, but there is a greater danger of missing the maximum. The correlations are calculated for neighboring offsets of all previously calculated offsets with correlations that are greater than 75% of the current maximum. The maximum is checked and updated as new correlations are calculated. This process is continued until no more correlations need to be calculated. The final maximum indicates warp error to the nearest pixel.

This method has been successful in reducing the number of calculations substantially while not missing the true maximum. Some regions may be ill-conditioned and require all the offset correlations be calculated within the range to find the maximum. Most regions should have at least half the number of calculations reduced by this method.

The number of offset correlations that are calculated are determined by the error range as determined by the user of the program. The smaller the range limitation, the less chance of errors due to objects being repeated within the range.

The surrounding correlations to the maximum are used to estimate the warp error to less than a pixel 150. There are many possible interpolation techniques that can be used.

In an exemplary method of calculating a warp error value for a region, the warp error values in both the x and y directions are calculated as a function of the maximum correlation value and the correlation values of neighboring pixels.

Based on the following arrangement of pixels having regions centered at these pixels:

|   |   |   |
|---|---|---|
| A | B | C |
| D | E | F |
| G | H | I | where E represent the central pixel for the correlation region on the warped plane that has the maximum correlation value with the correlation region on the reference plane, the x warp error = x
offset + $(D-F)/(2*((F+D-2*E))$; and the y warp error = y
offset + $(B-H)/(2*((H+B-2*E))$.

The correlation value for the region centered at E is the offset having the maximum correlation value. The values for D, F, B and H correspond to the correlation regions centered at those pixels neighboring the central pixel for the correlation region having the maximum correlation with the reference correlation region.

An alternate method of determining the interpolation is to fit a Gaussian distribution to the correlation values for the regions centered at the surrounding points.

The x warp error indicates how much each pixel has to be offset in the x direction to be registered with the reference pixel. The warp error values for the pixels of the warped plane is the error range −0.5. Therefore, the error range determines the range of the warp error values using these calculations.

A metric is provided which determines whether the warp values obtained are accurate 160. First, the maximum correlation is subtracted from all calculated correlations. Next, all the correlations are summed and negated. The resulting value is divided by the maximum correlation and is again divided by the number of calculated correlations less one. The resulting value is then multiplied by 100.

Using the foregoing metric, a "100" value indicates a good registration while "0" means that the results are probably nonsense. It has been determined that anything above a 10 is reasonably accurate.

This process is repeated for each region of the warped plane 170 and for each of the warped planes 175.

The algorithm was implemented in software on a MASSCOMP computer. The correlations take about ten minutes elapse time for a 4-color 1K×1K image. This process can easily be run on multiple processors because each plane and region can be calculated independently. Thus the algorithm could run on a multiprocessor machine much faster.

The second portion of the algorithm pertains to implementing the calculations necessary to register the images based on the warp errors that were determined in the first part of the algorithm.

The warp process must smoothly transition from one region to another so that discontinuities are not visible. There are several ways of performing this process.

In the embodiment illustrated in FIG. 9, a smooth transition is provided between the divisional regions. First, phantom regions are created around surrounding the image 180. The phantom regions are used to calculate the warp values, but do not really exist. The values for these phantom regions are determined from the warp error values calculated from the correlation phase for the neighboring actual regions.

The phantom region values are selected such that they continue the trend of their adjacent actual regions. For instance, using the following arrangement of region designations:

| P1 | P2 | P3 | P4 | P5 |
|----|----|----|----|----|
| P18 | A | B | C | P6 |
| P17 | D | E | F | P7 |
| P16 | G | H | I | P8 |
| P15 | J | K | L | P9 |
| P14 | P13 | P12 | P11 | P10 | where the values of the lettered regions correspond to the x and y warp error values determined in the correlation phase, the warp values for the phantom regions are calculated as follows:

$$P2 = 2 * A - D$$

$$P3 = 2 * B - E$$

$$P7 = 2 * F - E$$

$$P8 = 2 * I - H$$

The corner phantom regions are an average of the two adjacent phantom regions: P1 = (P2 + P18)/2.

The x and y portions are treated independently. A kernel the size of one region is used to filter the x and y warp values 184. This particular filter is separable so the overall number of calculations can be reduced.

The integer portion of the filtered warp value is added to the current pixel position to obtain the nearest pixel to the correct value for output 190.

To achieve greater accuracy, an interpolation of the surrounding pixels is performed to find the appropriate value for the position of each pixel. Any conventional 2-D interpolator can be used. A bi-linear and cubic interpolator can be used also. This process is then repeated for each pixel in each plane.

The warp phase algorithm was implemented in software on the MASSCOMP computer. A 4-color 1K×1K image with three warped planes can be warped in about ten minutes. This process can be easily broken into many subprocesses so a multiprocessor computer could perform the warping faster.

As can be appreciated, a great advantage of this method is that it is able to register planes of images that have been warped in complex ways. This is done by breaking the image into regions that may have different warp values.

Additionally, this is an efficient method of registering planes on a computer in a reasonable amount of time with a minimum of calculations. This method also is superior to previous methods by accurately registering multi-plane images without requiring a test image.

I claim:

1. A method of measuring warp calculations for a plurality of regions of a digitized warped plane of an image relative to corresponding regions of a digitized reference plane of the same image, each of the planes comprising pixels representing luminosity values having scalar x and y coordinates representing positions in the horizontal and vertical directions, respectively, said method comprising the steps of:

(1) dividing said digitized reference plane into a plurality of reference regions;

(2) dividing said digitized warped plane into a plurality of corresponding regions;

(3) determining a central pixel of each said reference region of said digitized reference plane;

(4) determining a central pixel of each said corresponding region of said digitized warped plane;

(5) calculating a plurality of correlation values between each reference region centered on the central pixel thereof and a plurality of regions on the warped plane offset from said corresponding region of the warped plane centered on said central pixel thereof in a plurality of x and y directions, each of said correlation values being calculated as a function of gradient values for said warped plane region and said reference plane region, wherein each of said gradient values corresponds to the gradient of the plane at each of said pixel locations;

(6) comparing said plurality of correlation values to identify the offset region having a maximum correlation value with said reference region; and (7) calculating warp error values in the x and y directions for said warped region as a function of a scalar offset value corresponding to the offset of the central pixel of said maximum correlation offset region.

2. The method of claim 1 wherein each of said gradient values at a pixel location is calculated as a function of a luminosity value for said pixel and luminosity values of pixels two positions over from said pixel.

3. The method of claim 1 wherein each of said correlation values is calculated by multiplying gradient values of said reference region with corresponding gradient values of said warped region; and summing up the resulting products.

4. The method of claim 1 wherein each of said warp error values is calculated as a function of said maximum correlation value and correlation values for a plurality of offset regions neighboring said maximum correlation region.

5. The method of claim 4 wherein each of said warp error values is calculated as a function of a Gaussian distribution fitted to said correlation values for said neighboring offset regions.

6. The method of claim 1 further comprising the step of using a metric function to indicate the accuracy of said warp error values.

7. A registration method of registering pixels of a warped plane with pixels of a reference plane using the method of claim 1 to determine warp error calculations for a plurality of regions of the warped plane, said registration method comprising the steps of:

(1) determining a filtered warp value for each region of said warped plane by filtering said warp error values using a kernel; and (2) adding said filtered warp values to each of said pixel positions.

8. The method of claim 7 further comprising the steps of:

(1) calculating warp error values for a plurality of phantom regions surrounding the warped plane, each of said phantom values being a function of neighboring region warp error values; and (2) interpolating each pixel of said warped plane with neighboring pixels.

9. A method of measuring warp values between separate color planes of a digitized image, each of the planes comprising pixel values corresponding to the luminosity of a color at each location in the x and y directions, said method comprising the steps of:

(1) selecting one of said planes as a reference plane;

(2) calculating a gradient value for said planes at each of said pixels relative neighboring pixels;

(3) dividing the image into a plurality of regions;

(4) selecting another of said planes as a warped plane to be registered with said reference plane;

(5) for each of said divisional regions of said reference plane identifying a corresponding divisional region on said warped plane;

(6) identifying a plurality of correlation regions centered at central pixels of each of said divisional regions on said warped plane;

(7) calculating a plurality of correlation values between each of said reference correlation regions and offset regions on said warped plane centered at pixels offset from each of said corresponding central pixels;

(8) for each region of the warped plane, comparing said plurality of correlation values to determine a maximum correlation offset corresponding to the offset in the x and y direction of the offset central pixel for the region having the maximum correlation value from said regional central pixel; and (9) calculating an x and y component of a warp error value for each of said pixels in each of said warped region as a function of said maximum correlation offset.

10. The method of claim 9 wherein said planes correspond to cyan, magenta, yellow and black color components of said image and the reference plane is said magenta plane.

11. The method of claim 9 wherein a plurality of pixels are removed from surrounding each of said planes.

12. The method of claim 9 wherein each of said gradient calculations for said planes is made by squaring the difference between the luminosity value at a given pixel and the luminosity value at a pixel two x positions over from said pixel and adding that value to the square of the difference between the luminosity value at said pixel and the luminosity value at a pixel two y positions over.

13. The method of claim 9 wherein said maximum correlation offset is determined from a range of offset regions corresponding to an error range for said warp error values.

14. The method of claim 9 wherein said correlation regions have a smaller area than said reference region.

15. The method of claim 9 wherein each of said correlation values is determined by multiplying each of said gradient values of said reference correlation region with a corresponding gradient value in the offset region; and performing a plurality of summations for each of the resultant values.

16. The method of claim 15 wherein each of said correlation values is normalized by the number of summations performed to determine normalized correlation values.

17. A method of registering planes of an image using said warp calculations of claim 9 comprising the steps of:

(1) calculating warp error values for a plurality of phantom regions surrounding said warped plane as a function of a plurality of warp error values of bordering regions;

(2) filtering each of said warp error values using a region size rectangular kernel; and (3) interpolating the x and y positions for each of said pixels of said warped plane using the filtered warp values.

18. A method for registering digitized planes of an image, said planes comprising a plurality of pixels, said method comprising the steps of:
   (1) selecting one of said planes as a reference plane and the others of said planes as warped planes;
   (2) dividing the image into divisional regions;
   (3) calculating a plurality of gradient values for each of said planes at the location of each of said pixels;
   (4) selecting one of said planes as a warped plane to be registered with said reference plane;
   (5) correlating said gradients for each of said regions of said reference plane with each of said gradients of a plurality of offset regions of said warped planes;
   (6) determining offsets for regions of said warped planes which provide the greatest correlations;
   (7) interpolating said offsets to determine warp errors for each of said regions of each of said warped planes;
   (8) determining warp error values for phantom regions along the borders of said warped planes;
   (9) using a plurality of region sized kernels to filter each of said warp error values for each of said regions of said warped planes; and
   (10) using said filtered warp error values to interpolate image plane pixel positions.

19. The method of claim 18 further comprising the step of determining a maximum error range, wherein said offset values are limited by said error range.

20. The method of claim 18 wherein said divisional regions are rectangular and of equal sizes.

* * * * *